United States Patent
Wang et al.

(10) Patent No.: US 8,705,870 B2
(45) Date of Patent: Apr. 22, 2014

(54) IMAGE SEARCHING BY APPROXIMATE k-NN GRAPH

(75) Inventors: Jingdong Wang, Beijing (CN); Shipeng Li, Beijing (CN); Jing Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 13/411,213

(22) Filed: Mar. 2, 2012

(65) Prior Publication Data

US 2013/0230255 A1 Sep. 5, 2013

(51) Int. Cl.
- *G06K 9/50* (2006.01)
- *G06K 9/34* (2006.01)
- *G06K 9/54* (2006.01)

(52) U.S. Cl.
USPC .............. 382/201; 382/173; 382/305

(58) Field of Classification Search
USPC ............. 382/173, 199, 201, 204, 209, 305
See application file for complete search history.

(56) References Cited

U.S. PATENT DOCUMENTS

| | | | |
|---|---|---|---|
| 5,583,949 A | 12/1996 | Smith et al. | |
| 7,640,219 B2 | 12/2009 | Perrizo | |
| 7,659,894 B2 * | 2/2010 | Keller et al. ............... | 345/426 |
| 7,933,915 B2 | 4/2011 | Singh et al. | |
| 7,940,985 B2 | 5/2011 | Sun et al. | |
| 7,966,327 B2 | 6/2011 | Li et al. | |
| 2002/0081033 A1 | 6/2002 | Stentiford | |
| 2002/0164074 A1 | 11/2002 | Matsugu et al. | |
| 2007/0003138 A1 | 1/2007 | Hobson et al. | |
| 2007/0160274 A1 | 7/2007 | Mashiach | |
| 2007/0297651 A1 | 12/2007 | Schubert | |
| 2008/0304740 A1 | 12/2008 | Sun et al. | |
| 2009/0245638 A1 | 10/2009 | Collier et al. | |
| 2010/0106713 A1 | 4/2010 | Esuli et al. | |
| 2010/0119147 A1 | 5/2010 | Blake et al. | |
| 2010/0124375 A1 | 5/2010 | Wu et al. | |
| 2010/0293206 A1 | 11/2010 | Ylonen | |
| 2011/0058733 A1 | 3/2011 | Inoue et al. | |
| 2011/0075927 A1 | 3/2011 | Xu et al. | |

(Continued)

OTHER PUBLICATIONS (Fast Approximate kNN Graph Construction for High Dimensional Data via Recursive Lanczos Bisection), university of Minnesota, Oct. 2008, pp. 1-20.*

(Continued)

*Primary Examiner* — Daniel Mariam

(74) *Attorney, Agent, or Firm* — Carole A Boelitz; Micky Minhas; Lee & Hayes PLLC

(57) ABSTRACT

This disclosure describes techniques for searching for similar images to an image query by using an approximate k-Nearest Neighbor (k-NN) graph. The approximate k-NN graph is constructed from data points partitioned into subsets to further identify nearest-neighboring data points for each data point. The data points may connect with the nearest-neighboring data points in a subset to form an approximate neighborhood subgraph. These subgraphs from all the subsets are combined together to form a base approximate k-NN graph. Then by performing more random hierarchical partition, more base approximate k-NN graphs are formed, and further combined together to create an approximate k-NN graph. The approximate k-NN graph expands into other neighborhoods and identifies the best k-NN data points. The approximate k-NN graph retrieves the best NN data points, based at least in part on the retrieved best k-NN data points representing images being similar in appearance to the image query.

20 Claims, 10 Drawing Sheets

(56) References Cited

U.S. PATENT DOCUMENTS

| | | |
|---|---|---|
| 2012/0259850 A1 | 10/2012 | Liu et al. |
| 2012/0268612 A1 | 10/2012 | Wang et al. |
| 2012/0275701 A1 | 11/2012 | Park et al. |
| 2013/0132402 A1* | 5/2013 | Yang et al. ............. 707/748 |

OTHER PUBLICATIONS

Boutsidis, et al., "Random Projections for k-Means Clustering", In Proceedings of Advances in Neural Information Processing Systems, Dec. 2010, 9 pages.

Chum, et al., "Large-Scale Discovery of Spatially Related Images", In Proceedings of IEEE Transactions on Pattern Analysis and Machine Intelligence, vol. 32, Issue 2, Feb. 2010, 8 pages.

Davidson, et al., "A Survey of Clustering with Instance Level Constraints", In Proceedings of ACM Transactions on Knowledge Discovery from Data, Mar. 2007, 41 pages.

Elkan, Charles, "Using the Triangle Inequality to Accelerate k-Means", In Proceedings of the Twentieth International Conference on Machine Learning, Aug. 21, 2003, 7 pages.

Fei-Fei, et al., "Learning Generative Visual Models from Few Training Examples: An Incremental Bayesian Approach Tested on 101 Object Categories", In Proceedings of Computer Vision and Pattern Recognition Workshop, Jun. 27, 2004, 9 pages.

Fern, et al., "Random Projection for High Dimensional Data Clustering: A Cluster Ensemble Approach", In Proceedings of the Twentieth International Conference on Machine Learning, Aug. 21, 2003, 8 pages.

Frahling et al, "A Fast k-means Implementation Using Coresets", Int. Journal of Computational Geometry and Appl, Dec. 2008, 18(6), 10 pgs.

Jegou, et al., "Product Quantization for Nearest Neighbor Search", In Proceedings of IEEE Transactions on Pattern Analysis and Machine Intelligence, vol. 33, Issue 1, Jan. 2011, 12 pages.

Kanungo, et al., "An Efficient k-Means Clustering Algorithm: Analysis and Implementation", in Proceedings of IEEE Transactions on Pattern Analysis and Machine Intelligence, vol. 24, Issue 7, Jul. 2002, 12 pages.

Li et al, "Large Scale Robust Visual Codebook Construction", ACM Multimedia, Oct. 2010, 4 pgs.

Li, et al., "Modeling and Recognition of Landmark Image Collections using Iconic Scene Graphs", in Proceedings of the 10th European Conference on Computer Vision, Oct. 12, 2008, 14 pages.

Lloyd, Stuart P., "Least Squares Quantization in PCM", in Proceedings of IEEE Transactions on Information Theory, vol. 28, Issue 2, Mar. 1982, 9 pages.

Macqueen, J., "Some Methods for Classification and Analysis of Multivariate Observations", In Proceedings of the Fifth Berkeley Symposium on Mathematical Statistics and Probability, vol. 1, Nov. 23, 2012, 17 pages.

Mahajana, et al., "The Planar k Means Problem is NP-Hard", in Proceedings of the 3rd International Workshop on Algorithms and Computation, Feb. 18, 2009, 15 pages.

McCallum, et al., "Efficient Clustering of High-Dimensional Data Sets with Application to Reference Matching", In Proceedings of the Sixth ACM SIGKDD International Conference on Knowledge Discovery and Data Mining, Aug. 20, 2000, 10 pages.

Muja, et al., "Fast Approximate Nearest Neighbors with Automatic Algorithm Configuration", In Proceedings of the Fourth International Conference on Computer Vision Theory and Applications, vol. 1, Feb. 5, 2009, 10 pages.

Nister, et al., "Scalable Recognition with a Vocabulary Tree", in Proceedings of IEEE Computer Society Conference on Computer Vision and Pattern Recognition, Jun. 17, 2006, 8 pages.

Philbin, et al., "Object Mining Using a Matching Graph on Very Large Image Collections", In Proceedings of the Sixth Indian Conference on Computer Vision, Graphics & Image Processing, Dec. 17, 2008, 8 pages.

Philbin, et al., "Object Retrieval with Large Vocabularies and Fast Spatial Matching", In Proceedings of IEEE Computer Society Conference on Computer Vision and Pattern Recognition, Jun. 18, 2007, 8 pages.

Raguram, et al., "Modeling and Recognition of Landmark Image Collections Using Iconic Scene Graphs", in International Journal of Computer Vision, vol. 95, Issue 3, Dec. 16, 2011, 28 pages.

Sculley, D., "Web-Scale k-Means Clustering", In Proceedings of the 19th International Conference on World Wide Web, Apr. 26, 2010, 2 pages.

Simon, et al., "Scene Summarization for Online Image Collections", In Proceedings of IEEE 11th International Conference on Computer Vision, Oct. 14, 2007, 8 pages.

Sivic, et al., "Video Google: A Text Retrieval Approach to Object Matching in Videos", In Proceedings of the Ninth IEEE International Conference on Computer Vision, Oct. 13, 2003, 8 pages.

Steinbach, et al., "The Challenges of Clustering High Dimensional Data", in Proceedings of New Vistas in Statistical Physics: Applications in Econophysics, Bioinformatics, and Pattern Recognition, Nov. 22, 2012, 33 pages.

Torralba, et al., "80 Million Tiny Images: A Large Data Set for Nonparametric Object and Scene Recognition", In Proceedings of IEEE Transactions on Pattern Analysis and Machine Intelligence, vol. 30, Issue 11, Nov. 2008, 12 pages.

Xiong, et al., "Spectral Active Clustering via Purification of the k-Nearest Neighbor Graph", In Proceedings of the European Conference on Data Mining, Jul. 21, 2012, 9 pages.

Yan, et al., "Pairwise Constrained Clustering for Sparse and High Dimensional Feature Spaces", In Proceedings of the 13th Pacific-Asia Conference on Advances in Knowledge Discovery and Data Mining, May 29, 2009, 8 pages.

U.S. Appl. No. 13/545,253, Wang, et al., "Salient Object Segmentation", filed Jul. 10, 2012.

Blaschko, et al., "Learning to Localize Objects with Structured Output Regression", In Proceedings of the 10th European Conference on Computer Vision: Part I, Oct. 12, 2008, 14 pages.

Chen, et al., "A Visual Attention Model for Adapting Images on Small Displays", In Journal of Multimedia Systems, vol. 9, No. 4, Oct. 2003, 12 pages.

Chen, et al., "Using Random Forest to Learn Imbalanced Data", In Technical Report of Statistics Department, University of California, Berkeley, Jul. 2004, 12 pages.

Dalal, et al., "Histograms of Oriented Gradients for Human Detection", In Proceedings of the IEEE Computer Society Conference on Computer Vision and Pattern Recognition, Jun. 25, 2005, 8 pages.

Feng, et al., "Salient Object Detection by Composition", In IEEE International Conference on Computer Vision, Nov. 6, 2011, 8 pages.

Girshick, et al., "Efficient Regression of General-Activity Human Poses from Depth Images", In Proceedings of the 13th International Conference on Computer Vision, Nov. 6, 2011, 8 pages.

Gopalakrishnan, et al., "Random Walks on Graphs for Salient Object Detection in Images", In IEEE Transactions on Image Processing, vol. 19, Issue 12, Dec. 2010, 11 pages.

Hou, et al., "Thumbnail Generation Based on Global Saliency", In 1st International Conference on Cognitive Neurodynamics, Nov. 17, 2007, 5 pages.

Jiang, et al., "Automatic Salient Object Segmentation Based on Context and Shape Prior", In Proceedings of the 22nd British Machine Vision Conference, Aug. 29, 2011, 12 pages.

Judd, et al., "Learning to Predict Where Humans Look", In Proceedings of IEEE International Conference on Computer Vision, Sep. 27, 2009, 8 pages.

Kadir, et al., "Saliency, Scale and Image Description", In International Journal of Computer Vision, vol. 45, Issue 2, Jun. 2001, 23 pages.

Liu, et al., "An Improved Image Segmentation Algorithm for SalientObject Detection", In Proceedings of 23rd International Conference Image and Vision Computing, Nov. 28, 2008, 6 pages.

Luo, et al., "Saliency Density Maximization for Object Detection and Localization", In Proceedings of the 10th Asian conference on Computer Vision—vol. Part III, Nov. 8, 2010, 12 pages.

(56) References Cited

OTHER PUBLICATIONS

Ma et al, "Contrast-based Image Attention Analysis by Using Fuzzy Growing," Proc 11 ACM Intl Conf on Multimedia, Nov. 2-8, 2003, pp. 374-381.
Marchesotti, et al., "A Framework for Visual Saliency Detection with Applications to Image Thumbnailing", In IEEE 12th International Conference on Computer Vision, Sep. 29, 2009, 8 pages.
Oliva, et al., "Modeling the Shape of the Scene: A Holistic Representation of the Spatial Envelope", In International Journal of Computer Vision, vol. 42, Issue 3, Jan. 2001, 31 pages.
Pauly, et al., "Fast Multiple Organ Detection and Localization in Whole-Body MR Dixon Sequences", In Proceedings of the 14th International Conference on Medical Image Computing and Computer-Assisted Intervention—vol. Part III, Sep. 18, 2011, 8 pages.
Rahtu, et al., "Learning Category Independent Object Detection Cascade", In Proceedings of the 13th International Conference on Computer Vision, Nov. 6, 2011, 8 pages.
Rother, et al., "GrabCut-Interactive Foreground Extraction using Iterated Graph Cuts", In Journal of ACM Transactions on Graphics, vol. 23, Issue 3, Aug. 2004, 6 pages.
Santella, et al., "Gaze-Based Interaction for Semi-Automatic Photo Cropping", In Proceedings of the SIGCHI Conference on Human Factors in Computing Systems, Apr. 22, 2006, 10 pages.
Shotton, et al., "Real-Time Human Pose Recognition in Parts from Single Depth Images", In Proceedings of the IEEE Conference on Computer Vision and Pattern Recognition, Jun. 20, 2011, 8 pages.
Silva, et al., "Multi-Scale Spectral Residual Analysis to Speed up Image Object Detection", In Conference on Graphics, Patterns and Images, Aug. 22, 2012, 8 pages.
Tu, et al., "Auto-Context and Its Application to High-Level Vision Tasks and 3D Brain Image Segmentation", In IEEE Transactions on Pattern Analysis and Machine Intelligence, vol. 32, No. 10, Oct. 2010, 14 pages.
Wang, et al., "Automatic Salient Object Extraction with Contextual Cue", In Proceedings of the 13th International Conference on Computer Vision, Nov. 6, 2011, 8 pages.
Wang, et al., "Simulating Human Saccadic Scanpaths on Natural Images", In Proceedings of the IEEE Conference on Computer Vision and Pattern Recognition, Jun. 20, 2011, 8 pages.
Zhang, et al., "An Adaptive Computational Model for Salient Object Detection", In IEEE Transactions on Multimedia, vol. 12, Issue 4, Jun. 2010, 17 pages.
Achanta, et al., "Frequency-tuned Salient Region Detection", <<http://www.cs.utoronto.ca/strider/publications/SaliencyCVPR09.pdf>>, IEEE CVPR, 2009, 8 pages.
Alexe, et al., "What is an object'?", CVPR, 2010, pp. 73-80.
Arya, et al., "Approximate Nearest Neighbor Queries in Fixed Dimensions", <<http://marmoset.cs.umd.edu/mount/Papers/soda93-ann.pdf>>, In SODA, 1993, 10 pages.
Avidan, et al., "Seam Carving for Content-Aware Image Resizing", <<http://users.soe.ucsc.edu/manazhao/files/seamcarving.pdf>>, 2007, 9 pages.
Belkin, et al., "Laplacian Eigenmaps for Dimensionality Reduction and Data Representation", <<http://192.5.53.208/~stefanko/Teaching/09CS446/Laplacian.pdf>>, Neural Computation, 15(6):1373-1396, 2003.
Bentley, "Multidimensional Binary Search Trees Used for Associative Searching", <<http://cgi.di.uoa.gr/ad/MDE515/p509-bentley.pdf>>, Communications of the ACM, vol. 18, No. 9, Sep. 1975, pp. 509-517.
Bentley, "Multidimensional Divide-and-Conquer", <<http://akira.ruc.dk/keld/teaching/algoritmedesign_f03/Artikler/12/Bentley80.pdf>>, Communications of the ACM, vol. 23, No. 4, Apr. 1980, pp. 214-229.
Bentley, et al., "The complexity of finding fixed-radius near neighbors", Information Processing Letters, vol. 6, No. 1977, pp. 209-212.
Bhattacharya, et al., "A Framework for Photo-Quality Assessment and Enhancement based on Visual Aesthetics", ACM Multimedia, pp. 271-280, 2010.

Borenstein, et al., "Shape Guided Object Segmentation", in Proceedings of the IEEE Computer Society Conference on Computer Vision and Pattern Recognition, vol. 1, Jun. 22, 2006, pp. 969-976.
Boykov, et al., "An Experimental Comparison of Min-Cut/Max-Flow Algorithms for Energy Minimization in Vision", In IEEE Transactions on PAMI, vol. 26, No. 9, pp. 1124-1137, Sep. 2004.
Boykov, et al. "Interactive Graph Cuts for Optimal Boundary & Region Segmentation of Objects in N-D Images" Proceedings of Internation Conference on Computer Vision, Vancouver, Canada, Jul. 2001, 8 pages.
Breiman, "Random Forests", <<http://hci.iwr.uni-heidelberg.de/MIP/Teaching/pr/09-ex06/RandomForests.pdf>>, Machine Learning, vol. 45, No. 1, 2001, pp. 5-32.
Chapelle, et al., "Semi-Supervised Classification by Low Density Separation", <<http://citeseer.ist.psu.edu/viewdoc/download;jsessionid=0DC3C1DF5A3212CC3C39B0D1578A6488?doi=10.1.1.59.6843&rep=rep1&type=pdf>>, Proceedings of the 10th International Workshop on Artificial Intelligence and Statistics (AISTAT), 2005, pp. 57-64.
Chen, et al., "Fast Approximate kNN Graph Construction for High Dimensional Data via Recursive Lanczos Bisection", <<http://www.mcs.anl.gov/jechen/pub/divide_and_conquer_knn.pdf>>, Journal of Machine Learning Research, vol. 10, Sep. 2009, pp. 1989-2012.
Cheng et al., "Global Contrast based Salient Region Detection", <<http://cg.cs.tsinghua.edu.cn/people/cmm/saliency/ChengSaliencyCVPR2011S.pdf>>, IEEE CVPR, pp. 409-416, 2011.
Clarkson, "Fast Algorithms for the All Nearest Neighbors Problem", <<http://ieeexplore.ieee.org/stamp/stamp.jsp?tp=&arnumber=4568082>>, Proceedings of the 24th Annual Symposium on Foundations of Computer Science (FOCS), Nov. 1983, pp. 226-232.
Connor, et al., "Fast Construction of k-Nearest Neighbor Graphs for Point Clouds", <<http://ieeexplore.ieee.org/stamp/stamp.jsp?tp=&arnumber=5383353>>, IEEE Transactions on Visiualization and Computer Graphics, vol. 16, No. 4, Jul./Aug. 2010, pp. 599-608.
Dasgupta, et al., "Random projection trees and low dimensional manifolds", <<http://cseweb.ucsd.edu/dasgupta/papers/rptree-stoc.pdf>>, Proceedings of the 40th Annual ACM Symposium on Theory of Computing (STOC), May 2008, pp. 537-546.
Datar, et al., "Locality-Sensitive Hashing Scheme Based on p-Stable Distributions", <<http://citeseerx.ist.psu.edu/viewdoc/download?doi=10.1.1.134.8167&rep=rep1&type=pdf>>, Symposium on Computational Geometry (SOCG), 2004, pp. 253-262.
Datta, et al., "Studying Aesthetics in Photographic Images Using a Computational Approach", <<http://infolab.stanford.edu/wangz/project/imsearch/Aesthetics/ECCV06/datta.pdf>>, In ECCV, pp. 288-301, 2006.
Felzenszwalb, et al., "Distance Transforms of Sampled Functions", <<http://www.cs.cornell.edu/home/dph/papers/dt.pdf>>, Cornell Computing and Information Science TR2004-1963, 2004, 15 pages.
Felzenszwalb, et al., "Efficient Graph-Based Image Segmentation", <<http://pages.cs.wisc.edu/dyer/ai-qual/felzenszwalb-ijcv04.pdf>>, International Journal of Computer Vision, 59(2):167-181, 2004.
Friedman, et al., "An Algorithm for Finding Best Matches in Logarithmic Expected Time", <<http://www.dti.unimi.it/righini/Didattica/Algoritmi%20Euristici/MaterialeAE/k-d20trees.pdf>>, ACM Transactions on Mathemahcal Software, vol. 3, No. 3, Sep. 1977, pp. 209-226.
Ge, et al., "Image-Segmentation Evaluation From the Perspective of Salient Object Extraction", In Proceedings of the IEEE Computer Society Conference on Computer Vision and Pattern Recognition, Jun. 22, 2006, pp. 1146-1153.
Goferman, et al., "Context-Aware Saliency Detection", <<http://vc.cs.nthu.edu.tw/home/paper/codfiles/yhlee/201010290434/context-aware20saliency20detection.pdf>>, CVPR, pp. 2376-2383. IEEE, 2010.
Hacid, et al., "Incremental Neighborhood Graphs Construction for Multidimensional Databases Indexing", Proceedings of the 20th conference of the Canadian Society for Computational Studies of Intelligence on Advances in Artificial Intelligence (CAI), 2007, pp. 405-416.

(56) References Cited

OTHER PUBLICATIONS

Hou, et al., "Saliency Detection: A Spectral Residual Approach", <<http://www.klab.caltech.edu/xhou/papers/cvpr07.pdf>>, CVPR, 2007, 8 pages.

Itti, et al., "A Model of Saliency-Based Visual Attention for Rapid Scene Analysis", <<http://cseweb.ucsd.edu/classes/fa09/cse258a/papers/itti-koch-1998.pdf>>, IEEE Trans. Pattern Anal. Mach. Intell., 1254-1259, Nov. 1998.

Kolmogorov, "What Energy Functions Can Be Minimized via Graph Cuts?", IEEE Transactions on Pattern Analysis and Machine Intelligence, vol. 26, No. 2, Feb. 2004, 13 pages.

Kovesi, "MATLAB and Octave functions for computer vision and image processing", Centre for Exploration Targeting, School of Earth and Environment, The University of Western Australia. Available from: <<http://www.csse.uwa.edu.au/pk/research/matlabfns/>>, retrieved on Apr. 19, 2012, 16 pages.

Kulis, "Kernelized Locality-Sensitive Hashing for Scalable Image Search", <<http://www.eecs.berkeley.edu/kulis/pubs/iccv_klsh.pdf>>, Computer Vision, 2009 IEEE 12th International Conference, Oct. 2009, 8 pages.

Kumar, et al., "What Is a Good Nearest Neighbors Algorithm for Finding Similar Patches in Images?"<<http://www.cs.washington.edu/homes/neeraj/publications/base/papers/nk_eccv2008_nnsearch.pdf>>, ECCV '08 Proceedings of the 10th European Conference on Computer Vision: Part II, 2008, 15 pages.

Lanczos, "An Iteration Method for the Solution of the Eigenvalue Problem of Linear Differential and Integral Operators", <<http://x86.cs.duke.edu/courses/fall06/cps258/references/Krylov-space/Lanczos-original.pdf>>, Journal of Research of the National Bureau of Standards, vol. 45, No. 4, Oct. 1950, pp. 255-282.

Li, et al., "Lazy Snapping", <<http://uirvli.ai.uiuc.edu/tankh/citations/sketch_selection_iccv2001/li_siggraph2004.pdf>>, ACM Trans. Graph., 23(3): 303-308, 2004.

Liu, et al., "Learning to Detect a Salient Object", IEEE Transactions on Ptter Anazlysis and Machine Intelligence, vol. 33, No. 2, Feb. 2011, 15 pages.

Liu, et al., "An Investigation of Practical Approximate Nearest Neighbor Algorithms", <<http://www.autonlab.org/autonweb/14714/version/4/part/5/data/liu-nips04.pdf?branch=main&language=en>>, Proceedings of 17th Advances in Neural Information Processing Systems (NIPS), 2004, pp. 825-832.

Liu, et al., "Learning to Detect a Salient Object", Computer Vision and Pattern Recognition, IEEE Computer Society Conference, 2007, 8 pages.

Liu, et al., "Region Enhanced Scale-invariant Saliency Detection", <<http://www.cecs.uci.edu/~papers/icme06/pdfs/0001477.pdf>>, ICME, pp. 1477-1480, 2006.

Luo, et al., "Photo and Video Quality Evaluation: Focusing on the Subject", <<http://137.189.35.203/WebUI/PhotoQualityEvaluation/downloads/eccv08_Photo%20and%20Video%20Quality%20Evaluation.pdf>>, In ECCV, Part II, pp. 386-399, 2008.

Mahamud, et al., "Segmentation of Multiple Salient Closed Contours from Real Images", In Proceedings of the IEEE Transactions on Pattern Analysis and Machine Intelligence, vol. 25, No. 4, Apr. 2003, pp. 433-444.

Maier, et al., "Cluster Identification in Nearest-Neighbor Graphs", <<http://www.informatik.uni-hamburg.de/ML/contents/people/luxburg/publications/MaiHeiLux07_TR.pdf>>, Proceedings of the 18th International Conferenece on Algorithmic Learning Theory (ALT), May 2007, pp. 196-210.

Martin, et al., "Learning to Detect Natural Image Boundaries Using Local Brightness, Color, and Texture Cues", <<http://www.cs.princeton.edu/courses/archive/fall09/cos429/papers/martin_et_al.pdf>>, Submitted to IEEE Transactions on Pattern Analysis and Machine Intelligence, 2004, 20 pages.

Paredes, et al., "Practical construction of k-nearest neighbor graphs in metric spaces", WEA, 2006, pp. 85-97.

Rother, et al., ""GrabCut"—Interactive Foreground Extraction using Iterated Graph Cuts", <<https://mywebspace.wisc.edu/pwang6/personal/siggraph04.pdf>>, ACM Transactions on Graphics, 2004, 6 pages.

Roweis, et al., "Nonlinear Dimensionality Reduction by Locally Linear Embedding", <<http://www.csie.ntu.edu.tw/~mhyang/course/u0030/papers/Roweis%20Saul%20Science.pdf>>, Science, vol. 290, Dec. 2000, pp. 2323-2326.

Rutishauser, et al., "Is bottom-up attention useful for object recognition?", <<http://www.klab.caltech.edu/refweb/paper/477.pdf>>, In IEEE Conference on Computer Vision and Pattern Recognition, 2004, 8 pages.

Sebastian, et al., "Metric-based Shape Retrieval in Large Databases", <<http://www.lems.brown.edu/vision/publications/ICPR02.pdf>>, Proceedings of the 16th International Conference on Pattern Recognition (ICPR), vol. 3, 2002, pp. 291-296.

Silpa-Anan, et al., "Optimised KD-trees for fast image descriptor matching", <<http://mplab.ucsd.edu/wp-content/uploads/CVPR2008/Conference/data/papers/298.pdf, IEEE Conference on Computer Vision and Pattern Recognition (CVPR), Jun. 2008, 8 pages.

Stahl, et al., "Edge Grouping Combining Boundary and Region Information", IEEE Transactions on Image Processing, vol. 16, No. 10, Oct. 2007, 17 pages.

Tenenbaum, et al., "Global Geometric Framework for Nonlinear Dimensionality Reduction", <<http://iie.fing.edu.uy/investigacion/grupos/gti/cursos/sapiro_2007/material/documentos/sci_reprint.pdf Science, vol. 290, Dec. 2000, pp. 2319-2323.

Uno, et al., "Efficient Construction of Neighborhood Graphs by the Multiple Sorting Method", <<http://arxiv.org/pdf/0904.3151v1>> CORR, Apr. 2009, 15 pages.

Vaidya, "An O(n log n) algorithm for the all-nearest-neighbors problem", Journal of Discrete & Computational Geometry, vol. 4, No. 2, Jan. 1989, pp. 101-115.

Veksler, "Star Shape Prior for Graph-Cut Image Segmentation", <<http://www.csd.uwo.ca/faculty/olga/Papers/eccv2008Final.pdf, In Proceedings of the 10th European Conference on Computer Vision: Part III, ECCV '08, Berlin, Heidelberg, 2008. Springer-Verlag. ISBN 978-3-540-88689-1, 15 pages.

Verma, et al., "Which Spatial Partition Trees are Adaptive to Intrinsic Dimension?", <<http://uai2009.cs.mcgill.ca/papers/UAI2009_0226_79d59e9d41b3730af2ceed69aa130243.pdf, Proceedings of the 25th Conference on Uncertainty in Artificial Intelligence (UAI), 2009, pp. 565-574.

Vicente, et al., "Graph cut based image segmentation with connectivity priors", <<http://research.microsoft.com/pubs/80485/CVPR08-ConnectedGC.pdf>>, Computer Vision and Pattern Recognition, IEEE Computer Society Conference, 2008, 8 pages.

Virmajoki, et al., "Divide-and-conquer Algorithm for Creating Neighborhood Graph for Clustering", <<http://ieeexplore.ieee.org/stamp/stamp.jsp?tp=&arnumber=1334103>>, Proceedings of the 17th International Conference on PatternRecognition (ICPR), vol. 1, 2004, 4 pages.

Wang, et al., "Picture Collage", <<http://mmlabie.cuhk.edu.hk/2006/01640779.pdf>>, In Proceedings of CVPR 06, 2006, 8 pages.

Wang, et al., "Salient Closed Boundary Extraction with Ratio Contour", <<http://citeseerx.ist.psu.edu/viewdoc/summary?doi=10.1.1.58.9592>>, IEEE Transactions on Pattern Analysis and Machine Intelligence, vol. 27, No. 4, Apr. 2005, 16 pages.

Xue, et al., "Proto-Object Based Rate Control for JPEG2000: An Approach to Content-Based Scalability" IEEE Transactions on Image Processing, vol. 20, No. 4, Apr. 2011, 8 pages.

Yianilos, "Data Structures and Algorithms for Nearest Neighbor Search in General Metric Spaces", <<http://citeseerx.ist.psu.edu/viewdoc/download?doi=10.1.1.41.4193&rep=rep1&type=pdf>>, Proceedings of the 4thh annual ACM-SIAM Symposium on Discrete algorithms (SODA), 1993, pp. 311-321.

Zhang, et al., "Free-Shape Subwindow Search for Object Localization", <<http://130.203.133.150/viewdoc/summary?doi=10.1.1.163.85>>, In CVPR, 2010, 8 pages.

Zhou, et al., "Ranking on Data Manifolds", <<http://citeseerx.ist.psu.edu/viewdoc/download?doi=10.1.1.67.7846&rep=rep1

(56) References Cited

OTHER PUBLICATIONS

&type=pdf>>, Proceedings of 16th Advances in Neural Information Processing Systems (NIPS), 2003, 8 pages.

Zhu, "Semi-supervied Learning Literature Survey", <<http://citeseer.ist.psu.edu/viewdoc/download?doi=10.1.1.103.1693&rep=rep1&type=pdf>>, Computer Sciences Technical Report 1530, University of Wisconsin, Madison, 2007, 52 pages.

Office action for U.S. Appl. No. 13/403,747, mailed on Jul. 25, 2013, Jingdong Wang et al, "Salient Object Segmentation", 11 pages.

Final Office Action for U.S. Appl. No. 13/403,747, mailed on Dec. 17, 2013, Jingdong Wang, "Salient Object Segmentation", 16 pages.

* cited by examiner

1

IMAGE SEARCHING BY APPROXIMATE κ-NN GRAPH

BACKGROUND

The increasing popularity of image applications enables users to leverage use of cameras in mobile devices when performing some tasks. An image application may enable users to capture images on cameras of their mobile devices, which the image application can then submit as queries to perform a search. Typically, the image application evaluates candidate images that are similar to the query submitted to retrieve images that are relevant to the query.

Two types of graphs used to locate images similar to the query are: ϵ-nearest-neighbor (ϵ-NN) graph and k-nearest-neighbor (k-NN) graph. These neighborhood graphs are often used in computer vision and machine learning tasks, such as image retrieval, nearest neighbor search, manifold learning and dimension reduction, semi-supervised learning, manifold ranking, and clustering. However, these graphs present challenges in their searches.

For instance, the ϵ-NN graph includes two nodes that may be connected if their distances are within ϵ. Basically, the ϵ-NN graph searches for points that are close to a query point. Limitations of the ϵ-NN graph include being motivated by geometry and easily resulting in disconnected components. Therefore, the ϵ-NN graph is not particularly well suited in many applications.

On the other hand, the k-NN graph includes a node that is connected to its k nearest neighbors. The search methods may include an index structure and other search methodologies, such as kd-tree, vantage point tree, spill-tree, or hashing. However, these search methods suffer unfavorable trade-off between complexity of the index structure and accuracy of the search. Research efforts also include constructing an "exact" k-NN graph, which increases the time complexity of every image search. One problem is that the time complexity of the exact k-NN graph construction grows exponentially with respect to a dimension and grows super-linearly with respect to a number. Thus, this makes the exact k-NN graph impractical for high-dimensional data and large scale functions.

SUMMARY

This disclosure describes techniques for performing searches for similar images to an image query by using an approximate k-Nearest Neighbor (k-NN) graph. A process constructs the approximate k-NN graph by partitioning data points into subsets to identify nearest-neighboring data points for each data point. The process connects each data point with its nearest-neighboring data points in a subset in which the data points represent nodes to form an approximate neighborhood subgraph. The process combines multiple approximate neighborhood subgraphs to create a base approximate k-NN graph. The process repeats this procedure as described to construct multiple base approximate k-NN graphs. The process further combines the multiple base approximate k-NN graphs to form an approximate k-NN graph, which merges neighbors of the multiple base approximate k-NN graphs together and keeps best k-NN data points as the new k-NN data points.

Furthermore, the process may propagate the approximate k-NN graph by expanding from an immediate neighborhood to farther neighborhoods to locate additional nearest-neighboring nodes for each node in a best-first manner. This expansion of the approximate k-NN graph to other areas retrieves additional nearest-neighboring nodes that are true neighbors, and finally identifies the best k NN points as the refined k-NN points for each point.

The process searches the approximate k-NN graph for images that are similar in appearance to an image query. The image query may be represented as a node in the approximate k-NN graph. This searches for additional neighboring points for each node that are similar in appearance to the image query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
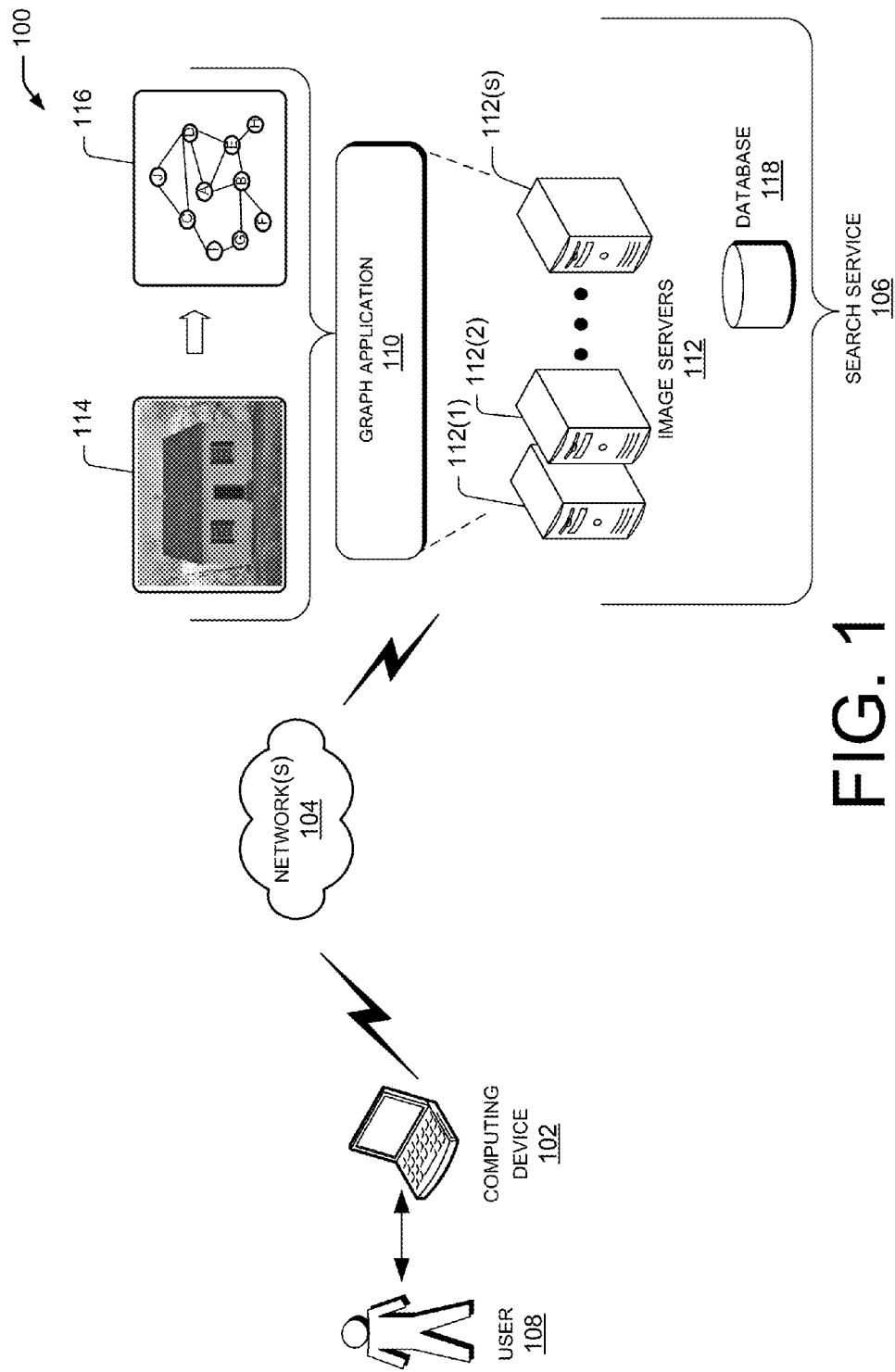
FIG. 1 illustrates an architecture to support an example environment to perform an image search by using an approximate k-NN graph.

This disclosure describes techniques for performing efficient neighborhood searches by using the approximate k-NN graph. The approximate k-NN graph is used for searches on image collections, data collections that are large scale and located on the World Wide Web, databases, and/or directories. In an implementation, a user may identify an image as a query and then a process searches for images that are similar in appearance to the image query by using the approximate k-NN graph. The approximate k-NN graph is an efficient approach to perform the searches quickly and accurately. Details of the process for creating the approximate k-NN graph are described below.

In another implementation, the approximate k-NN graph organizes a database to quickly retrieve images similar in appearance to the image query. The process creates the approximate k-NN graph by hierarchically partitioning the data points into subsets to locate nearest-neighboring data points for each data point. The nearest-neighboring data points have a high probability of lying in a same subset as the data point. The data points represent nodes to form the approximate neighborhood subgraphs. The process further combines multiple approximate neighborhood subgraphs to create a base approximate k-NN graph. The process further repeats the procedure as described, several times, and further combines the multiple base approximate k-NN graphs created to form an approximate k-NN graph. The process merges neighbors of the multiple base approximate k-NN graphs together and retains the best k-NN data points as the new k-NN data points. The process further propagates the approximate k-NN graph by expanding the immediate neighborhood to the farther neighborhood to find better k-NN points in a best-first manner.

The nodes in the approximate k-NN graph correspond to images. For instance, each image may be connected to several similar images, up to about 50 images in the neighborhood. This process for propagation may also consider visual and textual information to compute a similarity between the images.

For example, envision that the user desires to locate a house style "A," such as a Cape Cod style house. The user searches for images in a search engine, using query terms such as, "Cape Cod style house." The user may be interested in a particular image found from the search results and desires to locate additional images that are similar to the particular image.

The process searches over the approximate k-NN graphs to locate the additional images that are similar in appearance to the house style "A." The user may request the search be performed for many reasons such as, showing similar house styles with different paint colors; different types of roofing materials; various styles of shutters, doors and window frames, and the like. The process performs the searches, by looking for similar images in the database. In some implementations, the search may occur on World Wide Web, databases, directories, servers, blogs, websites, and the like. The process using the approximate k-NN graph accordingly returns a list of search results that are most similar in appearance to the query image. The user may click on the links that are most similar to the image query. The search results may be ranked order based on being most similar to the image query. In yet other examples, the searches may be used in a variety of other applications, such as object classification, feature matching, content-based retrieval, and the like.

The approximate k-NN graph is used in the searching, as the approximate k-NN graph provides a fast search that is accurate without being costly. For instance, the approximate k-NN graph is a directed graph G=(V, E) where V represents vertices/nodes, E represents edges, and k indicates a value for a number of requested nearest neighbors. The edges may connect the vertices/nodes based on sharing common visual and textual information. In an implementation, if the vertices/nodes do not share any visual and textual information, the edges may be removed between them. This helps identify relevant regions in the approximate k-NN graph to be searched, which speeds up the searching process.

While aspects of described techniques can be implemented in any number of different computing systems, environments, and/or configurations, implementations are described in the context of the following example computing environment.

Illustrative Environment

FIG. 1 illustrates an example architectural environment 100, in which efficient searches may occur by using the approximate k-NN graph to be performed on a computing device. The environment 100 includes an example computing device 102, which is illustrated as a laptop computer. The computing device 102 is configured to connect via one or more network(s) 104 to access a search service 106 for a user 108. It is noted that the computing device 102 may take a variety of forms, including, but not limited to, a portable handheld computing device (e.g., a personal digital assistant, a smart phone, a cellular phone), a tablet, a personal navigation device, a desktop computer, a portable media player, or any other device capable of connecting to one or more network(s) 104 to access the search service 106 for the user 108.

The computing device 102 may have additional features and/or functionality. For example, the computing device 102 may also include additional data storage devices (removable and/or non-removable) such as, for example, magnetic disks, optical disks, or tape. Such additional storage may include removable storage and/or non-removable storage. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. A system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 102. Any such computer storage media may be part of the computing device 102. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The network(s) 104 represents any type of communications network(s), including wire-based networks (e.g., cable), wireless networks (e.g., cellular, satellite), cellular telecommunications network(s), Wi-Fi networks, and IP-based telecommunications network(s). The search service 106 represents a service that may be operated as part of any number of online service providers, such as a search engine, or for applications such as image retrieval, and the like.

The search service 106 may operate in conjunction with a graph application 110 that executes on one or more of the image servers 112(1)-(S). The graph application 110 performs the processes described, such as searching for images that are similar in appearance to an image query 114 by using the approximate k-NN graph 116. This process occurs by partitioning the data points, creating approximate neighborhood subgraphs, and combining the approximate neighborhood subgraphs to form base approximate k-NN graph. Details of constructing the approximate k-NN graph 116 are discussed with reference to FIGS. 3-7. Thus, the graph application 110 searches for images similar to the image query 114, the Cape Cod style house. The architecture of the Cape Cod style house illustrates the distinct features of the house, such as the steep, pitched roof with end gables, a large chimney in the center, and little ornamentation on the outside. The graph application 110 performs searches for images having similar features to the steep, pitched roof and the large chimney in the center of the image query 114 by searching over the approximate k-NN graph 116.

In the illustrated example, the search service 106 is hosted on one or more servers, such as the image server(s) 112(1), 112(2), . . . , 112(S), accessible via the network(s) 104. The image servers 112(1)-(S) may be configured as plural independent servers, or as a collection of servers that are configured to perform larger scale functions accessible by the network(s) 104. The image server(s) 112 may be administered or hosted by a network service provider that provides the search service 106 to and from the computing device 102. The search service 106 may be implemented by the image servers 112 and the graph application 110 to and from the mobile device 102.

A database 118 may be a separate server or may be with a representative set of image servers 112 that is accessible via the network(s) 104. The database 118 may store information, such as image collections, image results, hash tables, algorithms to perform the processes described, and the like.

Figure 2:
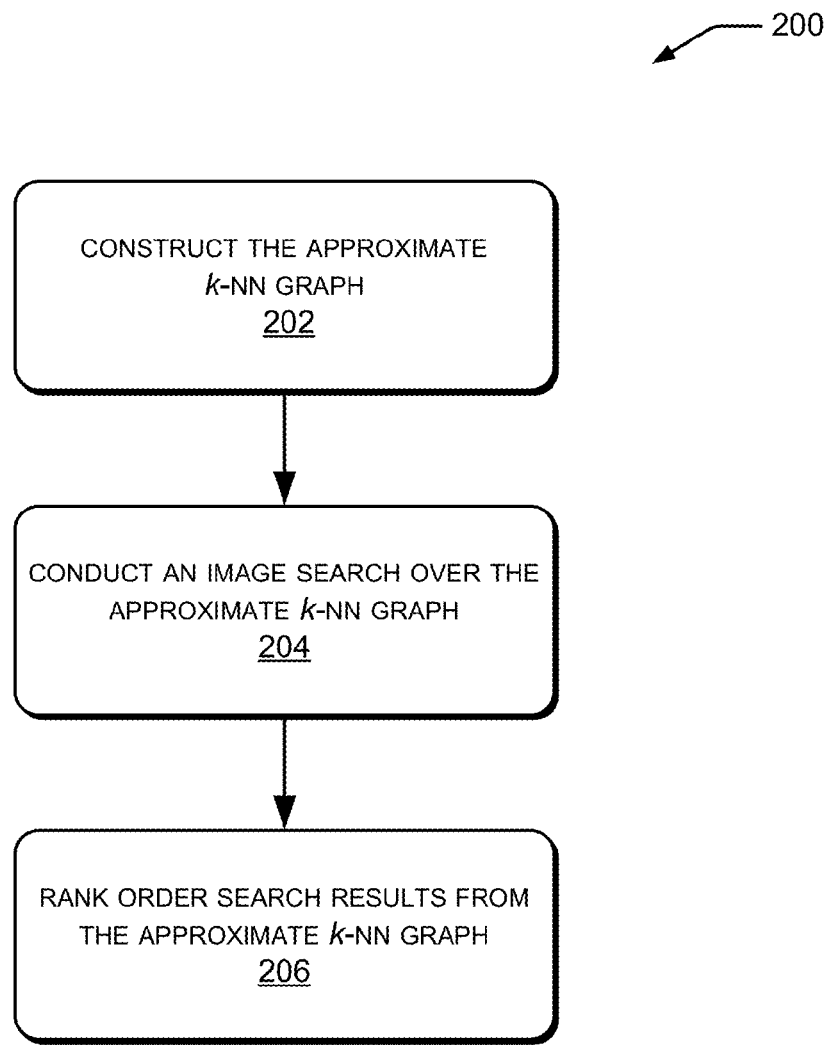
FIG. 2 is a flowchart to illustrate example phases at a high level to be used in the architecture of FIG. 1.
Figure 3:
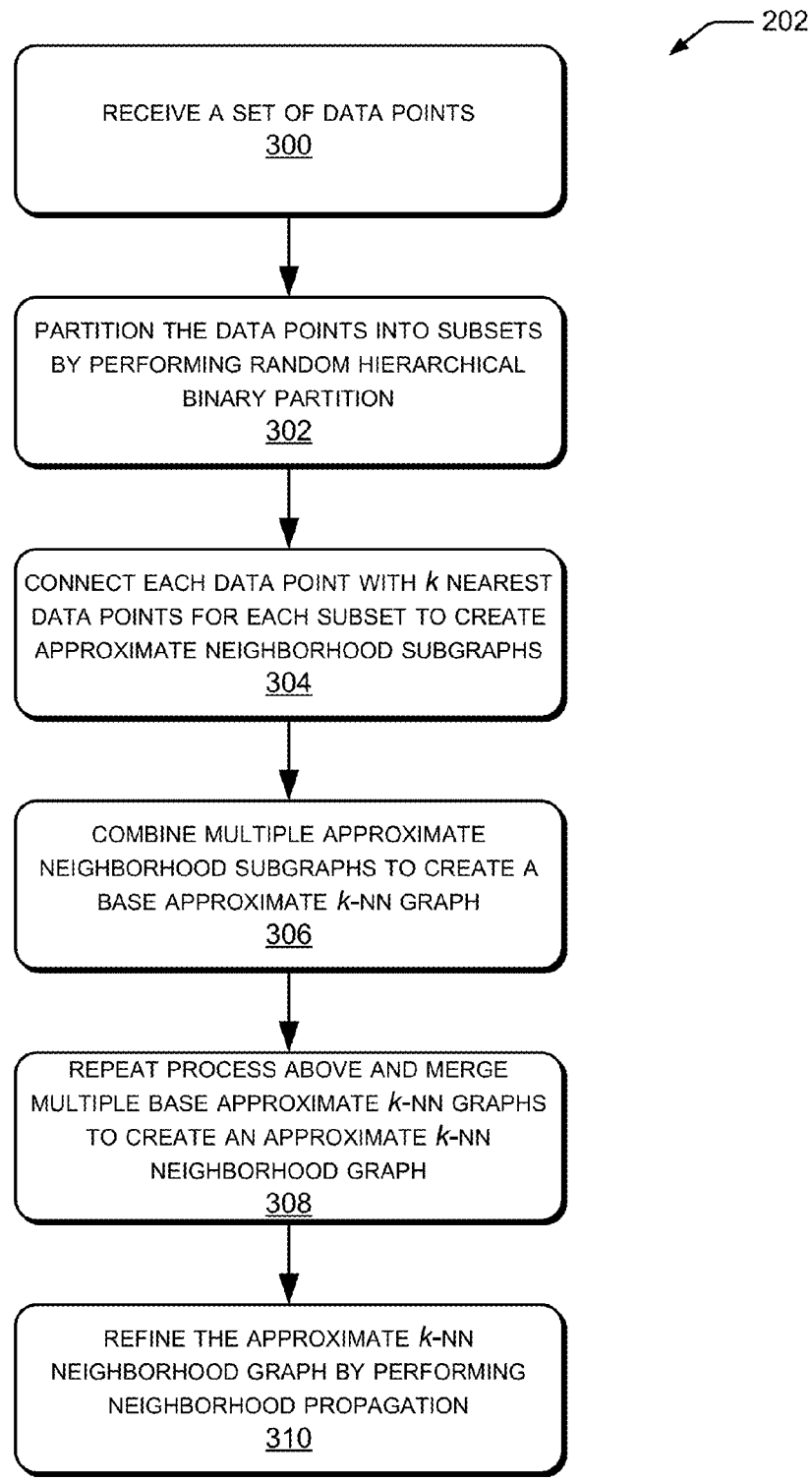
FIG. 3 is a flowchart to illustrate an example process of constructing an approximate neighborhood subgraph.
Figure 7:
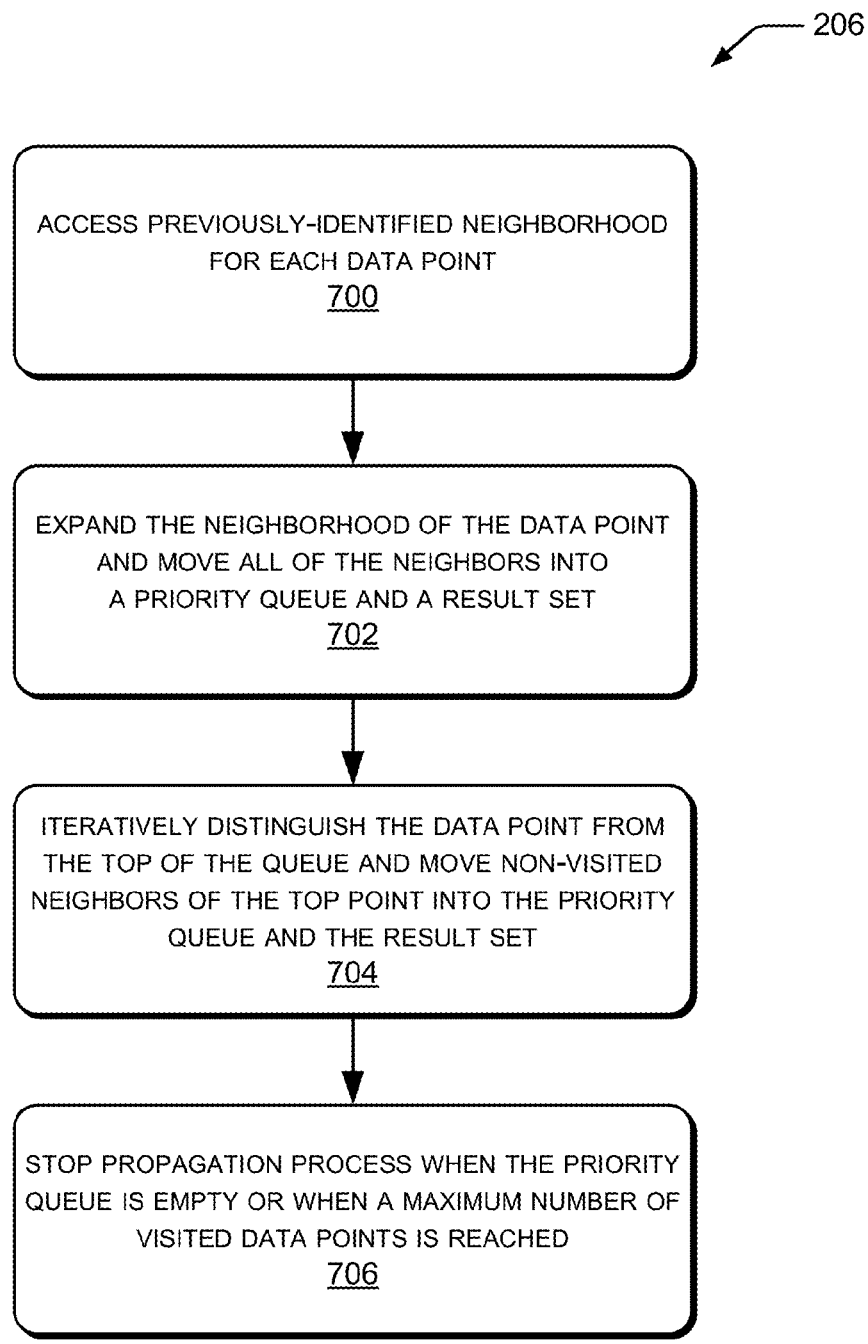
FIG. 7 is a flowchart to illustrate an example process of propagating the approximate k-NN graph from the immediate neighborhood to the farther neighborhoods to retrieve additional images that are similar in appearance to the image query.

FIGS. 2, 3, and 7 illustrate flowcharts showing example processes. The processes are illustrated as a collection of blocks in logical flowcharts, which represent a sequence of operations that can be implemented in hardware, software, or a combination. For discussion purposes, the processes are described with reference to the computing environment 100 shown in FIG. 1. However, the processes may be performed using different environments and devices. Moreover, the environments and devices described herein may be used to perform different processes.

For ease of understanding, the processes are delineated as separate steps represented as independent blocks in the figures. However, these separately delineated steps should not be construed as necessarily order dependent in their performance. The order in which the processes are described is not intended to be construed as a limitation, and any number of the described process blocks may be be combined in any order to implement the processes, or alternate processes. Moreover, it is also possible for one or more of the provided steps to be omitted.

FIG. 2 is a flowchart of an example process 200 showing high-level functions performed by the graph application 110. The process 200 may be divided into three phases, an initial phase 202 to construct the approximate k-NN graph, a second phase 204 to conduct an image search over the approximate k-NN graph, and a third phase 206 to rank order search results from the approximate k-NN graph. All of the phases may be used in the environment of FIG. 1, may be performed separately or in combination, and without any particular order.

The first phase 202 is to construct the approximate k-NN graph. For instance, the graph application 110 receives a plurality data points that may be from digital images of people, places, or things with foregrounds and backgrounds, photographs, medical images, fingerprint images, facial features, and the like. Based on the plurality of data points received, the graph application 110 applies a multiple random divide-and-conquer approach to construct approximate neighborhood subgraphs and base approximate k-NN graphs. The graph application 110 eventually merges the base approximate k-NN graphs to form the approximate k-NN graph.

The second phase 204 is to conduct an image search over the approximate k-NN graph. As described, the graph application 110 searches for images that are similar to the image query, which is a node in the approximate k-NN graph 116. This occurs by expanding the immediate neighborhood to farther neighborhoods to locate additional neighboring points for each node in the approximate k-NN graph 116. In an implementation, the graph application 110 performs the image search using the approximate k-NN graph over a database of a plurality of images.

The third phase 206 is to rank order search results from the approximate k-NN graph. The graph application 110 rank orders the search results by evaluating similarities between the image results and the image query 114. The rank ordering may be based on distances measured along a manifold, to be discussed later.

Figure 4:
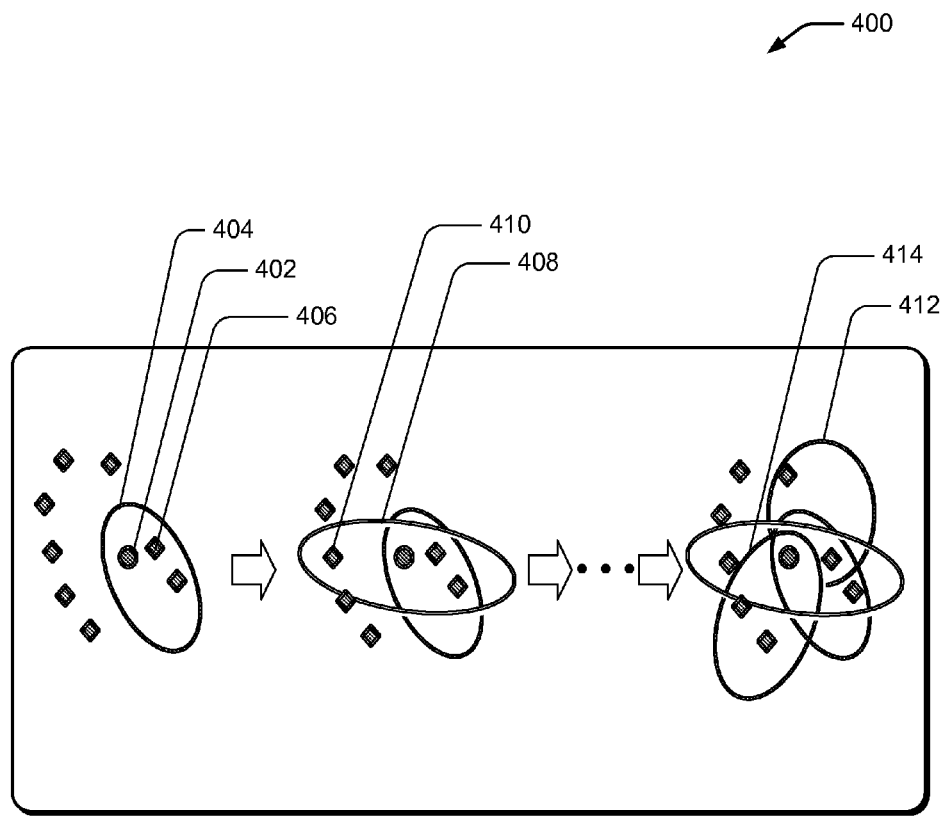
FIG. 4 is a schematic diagram that illustrates an example process that increasing a number of random divisions causes an increase in a number of nearest neighbors to a data point.
Figure 5:
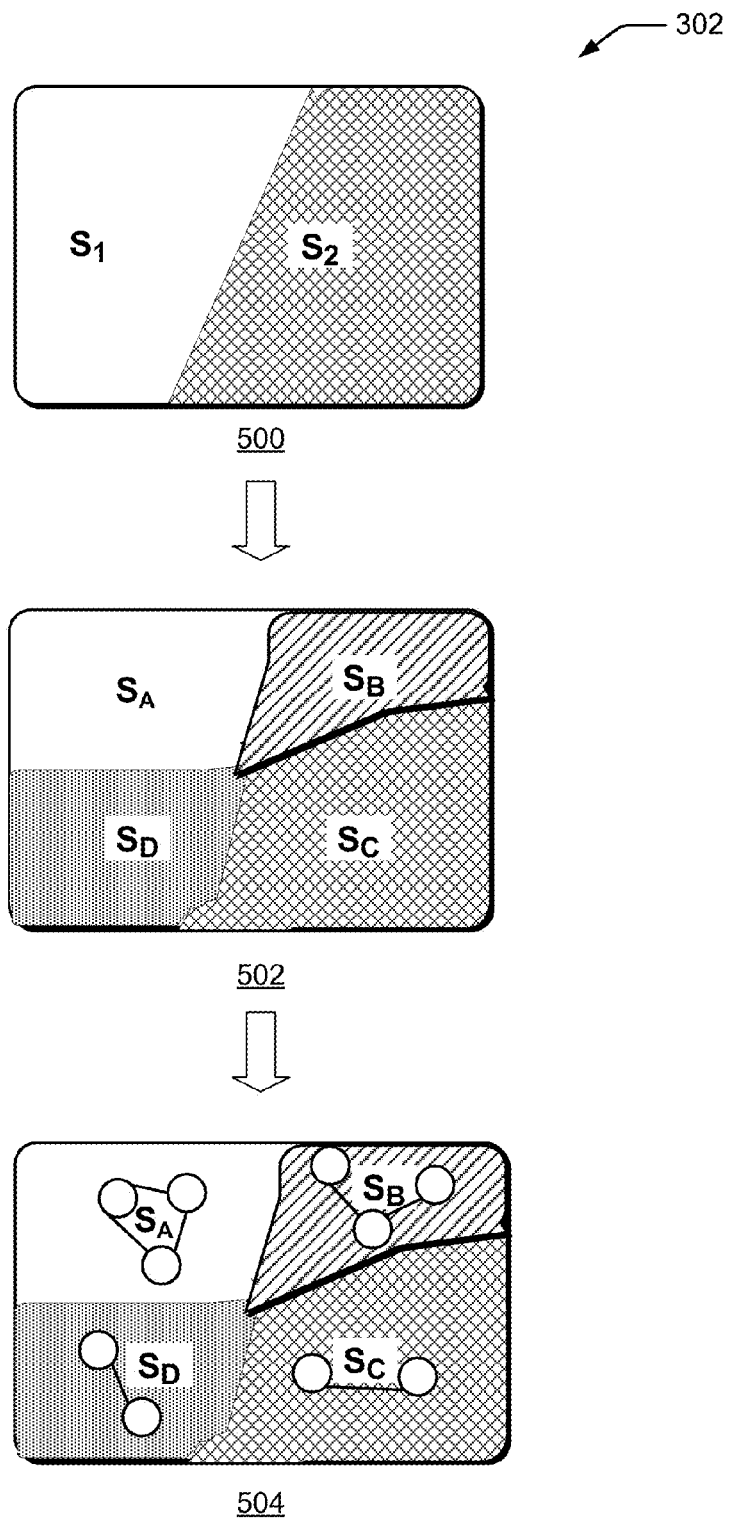
FIG. 5 is a schematic diagram that illustrates an example process of constructing a base approximate k-NN graph.
Figure 6:
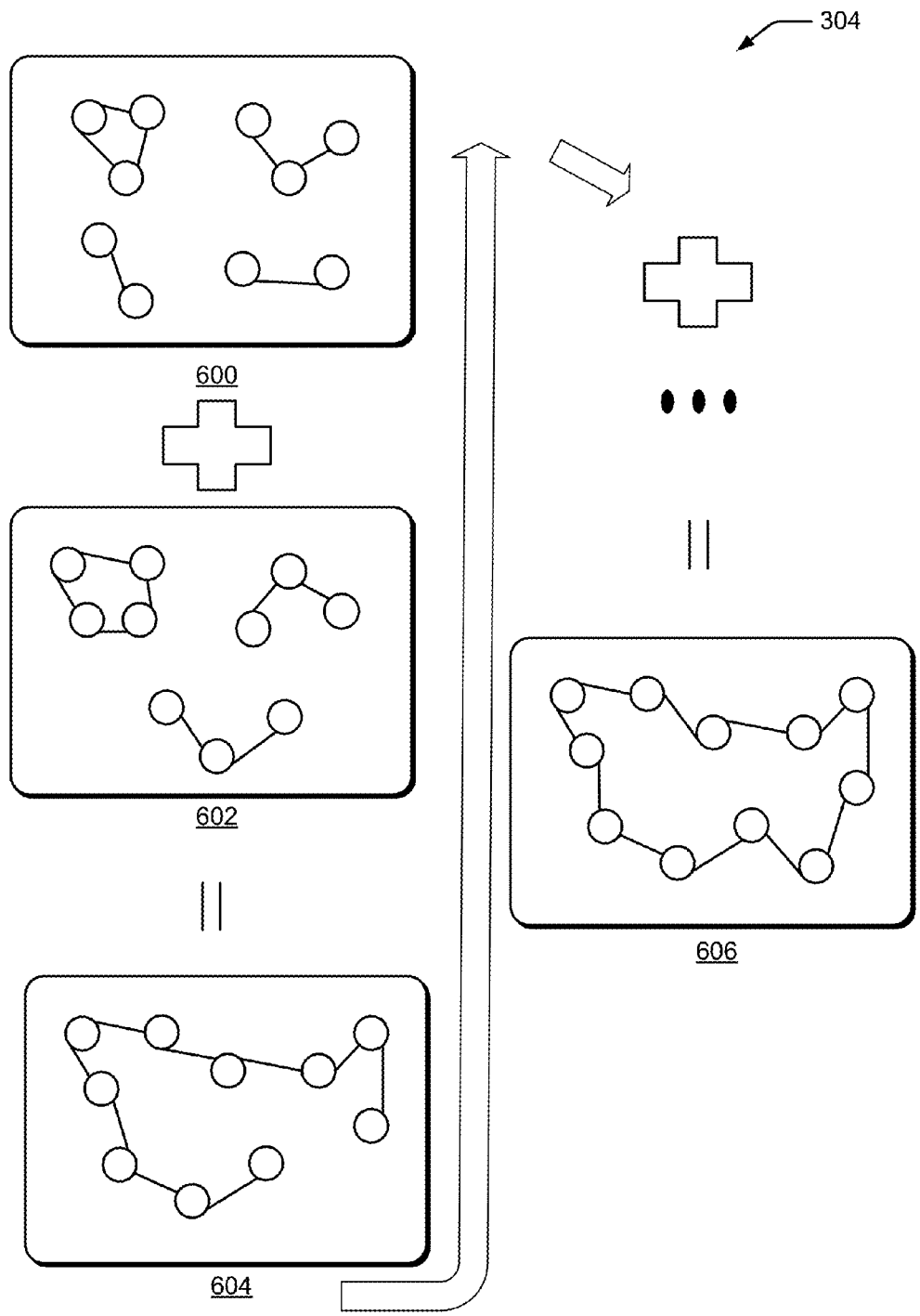
FIG. 6 is a schematic diagram that illustrates an example process of combining approximate neighborhood graphs to create an approximate k-NN graph.
Figure 8:
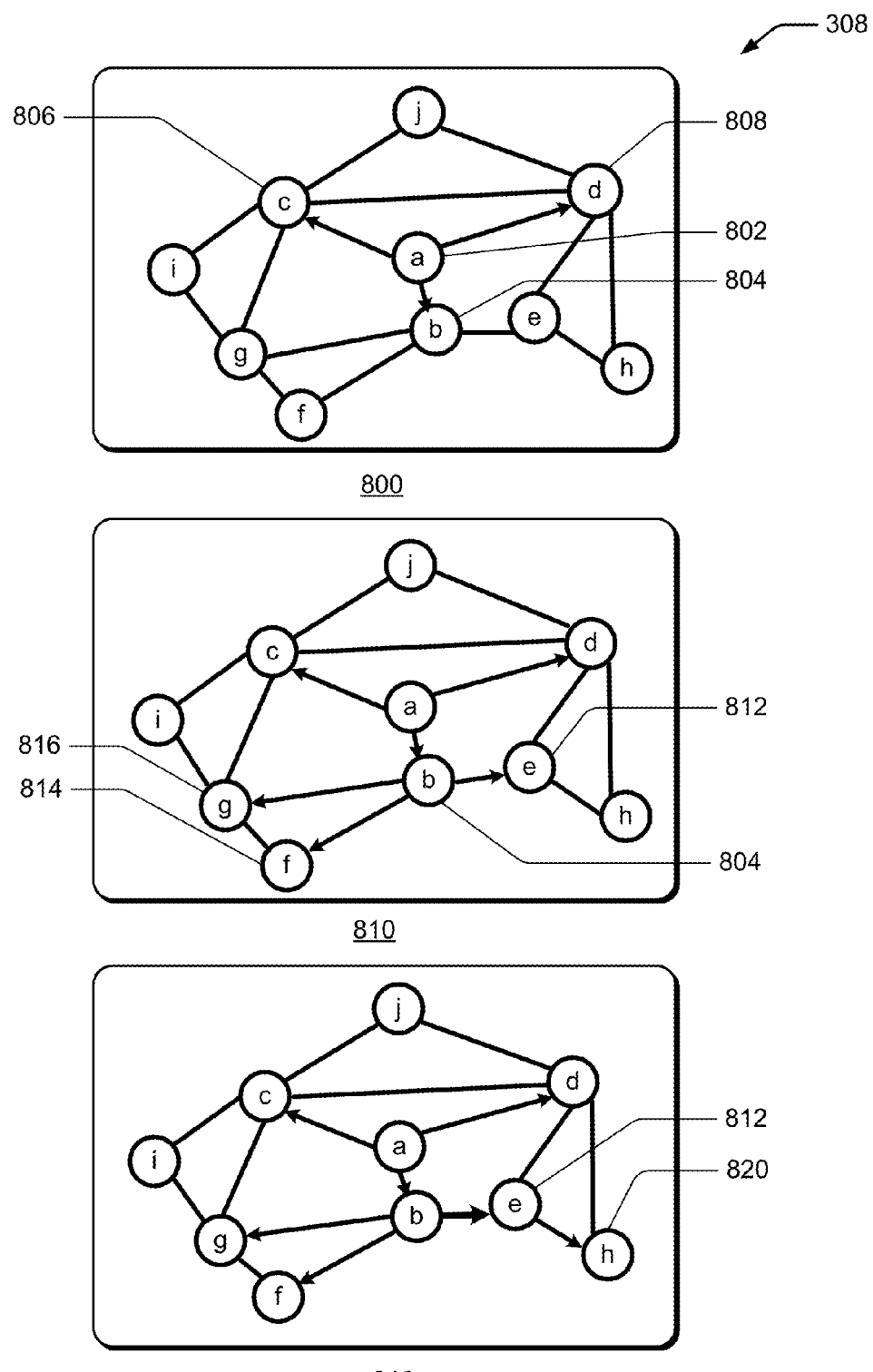
FIG. 8 is a schematic diagram that illustrates an example process of propagating the approximate k-NN graph from the immediate neighborhood to the farther neighborhoods.
Figure 9:
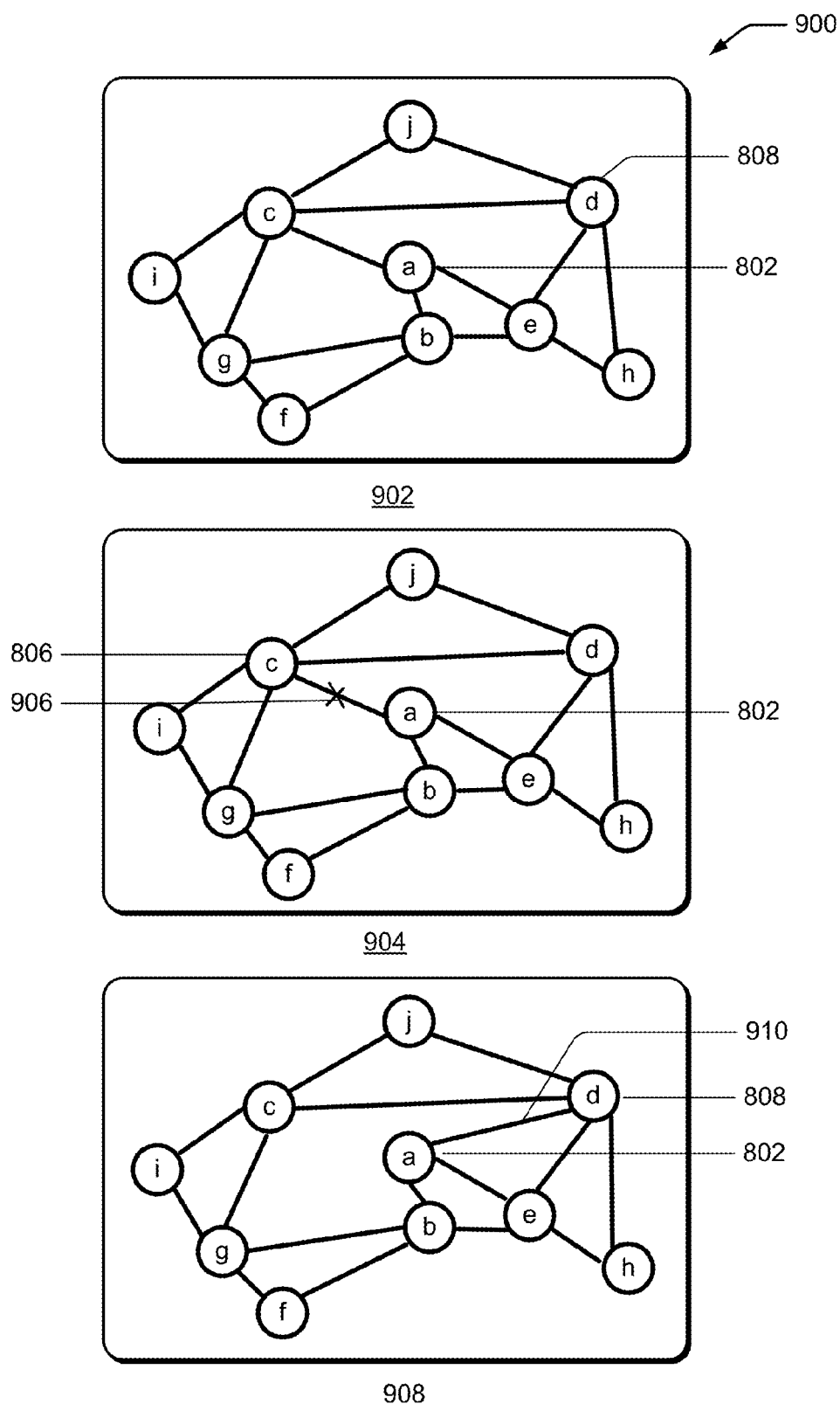
FIG. 9 is a schematic diagram that illustrates an example process of jointly propagating the approximate k-NN graph.

Details are discussed for constructing the approximate neighborhood subgraphs with reference to FIGS. 3-5, for combining approximate neighborhood graphs to create the approximate k-NN graph with reference to FIG. 6, for propagating the approximate k-NN graph from local neighborhood to wider areas with reference to FIGS. 7-8, and for jointly propagating the approximate k-NN graph with reference to FIG. 9. Details of the functions of the server are discussed with reference to FIG. 10.

Construct Approximate k-NN graph

FIG. 3 is a flowchart illustrating an example process for phase 202 (discussed at a high level above) of constructing the approximate k-NN graph.

At 300, the graph application 110 receives a set of data points. The data points may be from, a collection of images on a website, images of people, places or things, medical images, fingerprint images, video content, and the like. The set of data points may take many forms, such as video sequences, views from multiple cameras, or multi-dimensional data from a medical scanner. For instance, the set of data points may be represented by $X=\{x_1, x_2, x_n\}$ with $x_i \in R^d$ where $R^d$ represents a d-dimensional Euclidean space to build the approximate k-NN graph 116.

At 302, the graph application 110 partitions the data points into subsets by performing random hierarchical binary partition. The graph application 110 may perform a random division by using a methodology of a hyperplane or a hypersphere to partition the set of data points. This process makes nearby data points lie in a same subset. For instance, the graph application 110 divides the set of data points X into two non-overlapping subsets such as, a first set of data points on the left side represented by $X_l$ and a second set of data points on the right side represented by $X_r$ to satisfy a criteria that $X_l \cup X_r = X$ and $X_l \cap X_r = \emptyset$.

The graph application 110 recursively performs the division process on the subsets until a cardinality of a subset is smaller than a fixed value represented by g.

At 304, the graph application 110 connects each data point with k nearest data points for each subset to create approximate neighborhood subgraphs.

At 306, the graph application 110 combines multiple approximate neighborhood subgraphs to create a base approximate k-NN graph.

At 308, the graph application 110 repeats the process above and merges multiple base approximate k-NN graphs to create an approximate k-NN graph 116. The graph application 110 merges the neighbors of the multiple base approximate neighborhood graphs together and retains the best k-NN data points as the new k-NN data points. This procedure may be repeated several times. The base approximate k-NN graphs resulting from the multiple random divisions may be represented by $\{G_1, \cdots, G_M\}$ and an adjacent list represented by $Adj^m[xi]$ in $G_m$ for the data point $x_i$. Vertices are stored as records or objects and every vertex stores a list of adjacent vertices. The combination of the base approximate k-NN graphs may occur by uniting the adjacent lists $\{Adj^m[xi]\}$ $M_{m=1}$ together and by retaining k nearest neighbors.

Furthermore, at 310, the graph application 110 refines the approximate k-NN graph by performing neighborhood propagation. Propagation will be discussed with reference to FIGS. 7-8.

FIG. 4 illustrates an example process 400 that increasing the number of multiple random divisions causes an increase in a number of true nearest neighbors for a data point. For example, a data point may be represented by p, each random division may be interpreted as enumerating a set of neighboring points around p. This increase in the number of random divisions finds more true neighbors of p to improve on a quality of the combined neighborhood subgraphs.

For instance, the data point p 402 is represented by a circular shape. The increase in multiple random divisions helps find more true nearest neighbors of the data point p 402. The data point p 402 is enclosed by a first ellipse shape, a neighborhood 404, representing the neighborhood identified by a random division, enclosing its true nearest neighbor data point q 406 represented by a diamond shape. The set of points in the neighborhood 404 identified in a m-th division may be represented by $N_p^m$, and a union of the multiple sets of neighboring points may be represented as $N_p^m = \cup i < m N_p^i$.

Moving to the center diagram, another random division defines another neighborhood 408 as identified by a second ellipse shape. The neighborhood 408 encloses the data point r 410 with its nearest neighboring data point p 402 and data point q 406. Thus, the union becomes larger and covers more true neighbors of p.

The last diagram on the right side illustrates multiple random divisions occurred as indicated by two more ellipse shapes 412 and 414. The increase in multiple random divisions causes the increase in the number of true nearest neighbors of the data point 402. For instance, there are now six nearest-neighbor data points identified as the neighbors of p 402. Based on this information, the graph application 110 applies it toward constructing the graphs.

FIG. 5 illustrates the example process for constructing the base approximate neighborhood graph. The data points are received where a single random division yields a series of subsets. However, the data points in each of the subsets are isolated and do not connect with the neighboring points in other subsets.

At 500, the graph application 110 performs a hierarchical random binary partition on the data points to yield two subsets that do not overlap. Basically, the two subsets, $S_1$ and $S_2$ are isolated from each other. For example, $S_1$ may be represented with a white background, which is divided from $S_2$, which is represented with a hatchet pattern.

At 502, the graph application 110 performs another binary partition for each of subsets $S_1$ and $S_2$. For instance, the graph application 110 partitions subset $S_1$ into $S_A$ and $S_D$ as shown on the left side in 502. The graph application 110 also partitions subset $S_2$ into $S_B$ and $S_C$ as shown on the right side in 502.

At 504, each subset includes the data points. A brute force method is adopted to build the approximate neighborhood subgraphs for each subset of points. For instance, the brute force method may compute all pairwise distances and selects the k smallest ones for each data point. Next, the graph application 110 connects the data point with its nearest neighbor data point in each subset.

At 504, the graph application 110 constructs the base approximate k-NN graph by combining the approximate neighborhood subgraphs, where each subgraph represents each of the subsets, $S_A$, $S_B$, $S_C$, and $S_D$. This combination of the approximate neighborhood subgraphs creates the base approximate k-NN graph, which may be referred to as base approximate k-NN graph I. As discussed above, the data points form nodes which create the graphs.

Merge Multiple Base Approximate k-NN Graphs

FIG. 6 illustrates an example process 308 of combining multiple base approximate k-NN graphs to create the approximate k-NN graph 116. An advantage of using the approximate k-NN graph 116 is that the search is limited only to regions that are directly connected by the graph structure. Thus, the time complexity is reduced for every search.

As discussed above, given the set of data points $X = \{x_1, x_2, \ldots, x_n\}$, the nearest neighbor graphs includes the vertex set V and an edge set E. In an implementation, the graph application 110 may build the approximate k-NN graph 116 represented by G=(V, E). Criteria may include V=X, where the set of data points is $X = \{x_1, x_2, \ldots, x_n\}$, and data points $<x_i, x_j> \in E$ if and only if $p(x_i, x_j)$ is among the k smallest elements of the set $\{p(x_i, x_j) | 1=1, \ldots i-1, i+1 \ldots n\}$. The edges may be a proximity quantity measured between two data points, such as $x_i$, and $x_j$. Thus, the proximity quantity represented by $p(x_i, x_j)$ may determine an Euclidean distance or a cosine distance.

In an implementation, the graph application 110 constructs the approximate k-NN graph 116 as a nearest-neighbors search (NNS) problem. Every data point may be considered to be a query.

At 600, the base approximate k-NN graph I. discussed in FIG. 5 is shown for one neighborhood with four subgraphs corresponding to four partitions.

At 602, another base approximate k-NN graph is shown with three subgraphs corresponding to three partitions from another neighborhood. This base approximate k-NN graph may be referred to as base approximate k-NN graph II.

At 604, the graph application 110 combines base approximate k-NN graphs I. and II.

At 606, the graph application 110 may combine the base approximate k-NN graphs I. and II. 604 with additional base approximate k-NN graphs to create the approximate k-NN graph 116. In implementations, the graph created may be an approximate 2-NN graph, approximate 3-NN graph, and the like depending on the value assigned to k.

Propagating the Approximate k-NN Graph

FIG. 7 illustrates a flowchart of an example process 308 of propagating the approximate k-NN graph 116 to wider areas to retrieve better images. As a result of the propagating, the graph application 110 may locate more images that are similar in appearance quickly. In implementations, the approximate k-NN graph may connect each image with up to 50, 75, or 100 similar images.

At 700, the graph application 110 accesses a previously-identified neighborhood for each data point. Data points p 402 and q are used as examples below. In some implementations, the neighborhood may be a local neighborhood or an immediate neighborhood to the data point. The graph application 110 expands from the local or immediate neighborhood to farther neighborhoods to locate additional nearest-neighboring nodes for each node in a best-first manner.

At 702, the graph application 110 expands the neighborhood of the data point (e.g., p 402) and moves all of the neighbors into a priority queue and a result set. The neighboring data point q nearest to data point p 402 is positioned at a top of the priority queue. The size of the result set is fixed as k, which may be same as the nearest neighbors. The graph application 110 moves a data point into the result set by comparing the data point with other data points present in the result set. The comparison is that if the data point is more similar or nearer to a source data point, a farthest data point in the result set may be distinguished and this new data point is moved to the priority queue. The graph application 110 retains the most similar or nearest k-NN data points that are selected from visited data points.

At 704, the graph application 110 iteratively distinguishes the data point (e.g., q) from the top of the priority queue and moves non-visited neighbors of the top into the priority queue and the result set. The non-visited neighbors are data points that have not been considered to be candidate neighbors of the data point p 402.

At 706, the graph application 110 stops the propagation process when the priority queue is empty or when a maximum number of visited data points is reached. This threshold may be set up by the user 108 or determined automatically.

The visited data points are considered to be candidate neighbors of data point p 402 based in part on the result set. The better candidate neighbors replace current neighbors. Basically, the better candidate neighbors represent more similar k-NN data points. The graph application 110 performs the propagation process for all of the data points. A time complexity of the propagation process may be represented by O (T dn log T) where d represents a dimensionality, n represents a number of points, and T represents a maximum number of visited data points. Typically, T is very small when compared to n. Thus, the time cost of the neighborhood propagation process is linear with n and d, and tends to be very efficient.

FIG. 8 illustrates an example process 308 of propagating the approximate k-NN graph 116 from local neighborhood to other areas to retrieve better images. FIG. 8 shows node structures of the approximate k-NN graph 116. For each node, lists may be maintained on the edges to contain pointers to its k nearest neighbors. In an implementation, all nodes are stored in a heap by their similarity to the nearest one neighbor. This significantly speeds up the process of finding the most similar images to the image query 114.

At 800, the graph application 110 accesses the neighborhoods surrounding node a 802. Here, the graph application 110 expands a local neighborhood of node a 802 to its immediate neighbors, which includes k nearest neighbors, node b 804, node c 806, and node d 808. As mentioned, the k nearest neighbors are in the priority queue and the node b 804, which is nearest to node a 802 will be moved to the top of the priority queue.

At 810, the graph application 110 distinguishes node b 804 from the top of the priority queue and expands the neighborhood of node b 804 as indicated by the arrows to node e 812, node f 814, and node g 816. As a result of this expansion in 810, the neighborhood of node a 802 expands from its k nearest neighbor node b 804. For instance, node a 802 propagates along the paths from node b 804 to node e 812, from node b 804 to node f 814, and from node b 804 to node g 816.

At 818, the graph application 110 distinguishes node e 812 from the top of the queue and expands the neighborhood of node e 812 to include node h 820. As shown in 818, node a 802 propagates to node b 804, which propagates to node e 812, which propagates to node h 820. The graph application 110 continues the propagation process for all of the data points to find better k-NN data points. The propagation continues until the priority queue is empty or a maximum number of visited data points is reached.

In an implementation, the graph application 110 may set a result set to be about 3. In this instance, the graph application 110 may initially contain node b 804, node c 806, and node d 808 in the result set. After the graph application 110 expands the neighborhood of node b 804, the result set now contains node b 804, node c 806, and node e 812. Thus, the size has not changed but the nodes in the result set have changed in response to the expansion of the neighborhood of node b 804.

The graph application 110 may adopt a hash table to store information for pairs of data points. Typically, the distances between a pair of data points have been computed for performing the processes of multiple random divisions and/or the neighborhood propagation. To avoid re-computing the distances between the pairs of data points, the graph application 110 initially checks the hash table to determine if the distances between the pairs of data points have been calculated. This avoids duplicate calculations, saves significant amount of memory, and reduces cost especially for high-dimensional cases. For example, this time cost may be lower and the amount of time is reduced when using the hash table with the approximate k-NN graph for searches.

In an implementation, the graph application 110 may apply a pairwise updating scheme. The pairwise updating scheme is based on an observation of possibility that u is among the k nearest neighbors of v, if v is among the k nearest neighbors of u. For example, the graph application 110 may consider v to update the neighborhood of u. Consequently, the graph application 110 uses u to update the neighborhood of v.

In an implementation, the approximate k-NN graph 116 organizes the database to quickly and efficiently retrieve images that are similar in appearance to an image query. The approximate k-NN graph 116 finds neighboring data points by accessing a neighbor p and then expanding the neighborhood of p. Thus, the approximate k-NN graph organizes the information in the database to efficiently retrieve the information.

Jointly Propagating the Approximate k-NN Graph

FIG. 9 illustrates an example process 900 of jointly propagating the approximate k-NN graph 116. Joint propagation uses both visual and textual information to propagate from one node to the other nodes. The textual similarity from one node to another node may be embedded directly into the nodes.

At 902, the graph application 110 determines node a 802 and node d 808 share a common tag in textual information. For instance, the graph application 110 updates 3-NN points for node a 802 by using the textual information.

At 904, the graph application 110 further determines that node a 802 and node c 806 do not share a common tag or any textual information. Thus, the graph application 110 cuts or removes an edge 906 that connected node a 802 to node c 806. This edge is removed since the node a 802 and the node c 806 do not share any common textual information. Basically, the graph application 110 determines that node c 806 is not a nearest neighbor of node a 802.

At 908, the graph application 110 identifies a data point that is similar to node a 802. Here, the graph application 110 identifies node d 808 as replacing node c 806. The graph application 110 forms an edge 910 from node a 802 to node d 808. This edge connects the two nodes since the node a 802 and the node d 808 share a common tag or textual information. Joint propagation helps speed up the searching by removing portions that are not common and by connecting the portions that are similar.

In an implementation, propagation may occur by visual information. For instance, the graph application 110 identifies similar images to the image query by traversing the approximate k-NN graph 116. The k in the approximate k-NN graph 116 has been set to be 50. The graph application 110 propagates the visual information from one node to the other nodes to identify similar images in a best-first manner. For instance, the size of the result set may be set at 1000, which is different than k, which is set at 50. As a result, 1000 similar images to the image query will be returned by the graph application 110.

Example Server Implementation

Figure 10:
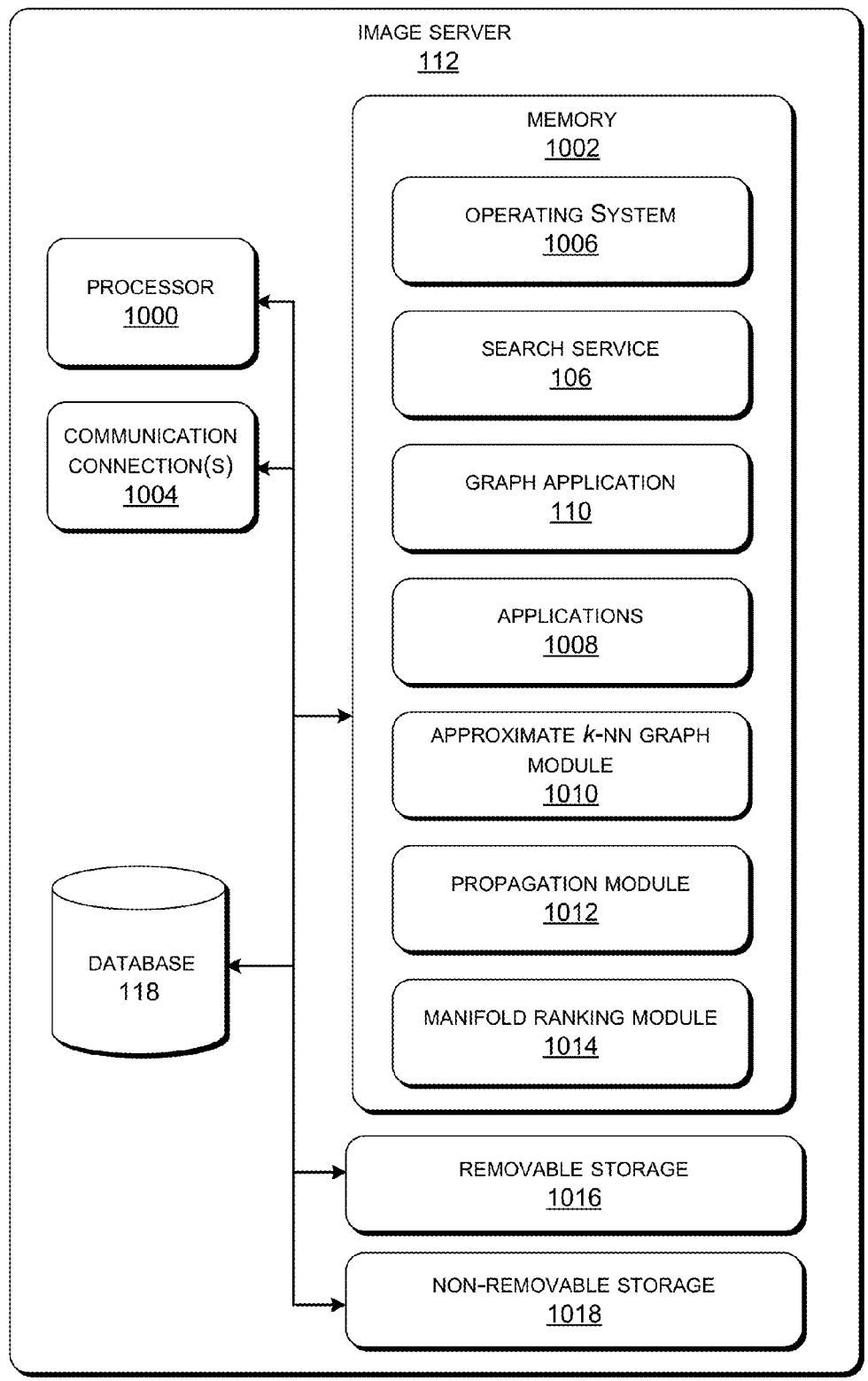
FIG. 10 is a block diagram to illustrate an example server usable with the environment of FIG. 1.

FIG. 10 is a block diagram to illustrate an example server usable with the environment of FIG. 1. The image server 112 may be configured as any suitable system capable of services, which includes, but is not limited to, implementing the search service 106 for image searches, such as providing the search engine to perform the image search. In one example configuration, the image server 112 comprises at least one processor 1000, a memory 1002, and a communication connection(s) 1004. The processor(s) 1000 may be implemented as appropriate in hardware, software, firmware, or combinations thereof. Software or firmware implementations of the processor(s) 1000 may include computer-executable or machine-executable instructions written in any suitable programming language to perform the various functions described.

In an implementation, a computer-readable storage media stores instructions, that when executed on the processor 1000, presents a user interface to receive an image query. The instructions further include searching for images similar in appearance to the image query based on the approximate k-NN graph 116, and presenting the user interface with a display of retrieved images ranked in order of being similar to the image query 114.

Similar to that of computing environment 100 of FIG. 1, memory 1002 may store program instructions that are loadable and executable on the processor(s) 1000, as well as data generated during the execution of these programs. Depending on the configuration and type of computing device, memory 1002 may be volatile (such as random access memory (RAM)) and/or non-volatile (such as read-only memory (ROM), flash memory, etc.).

The communication connection(s) 1004 may include access to a wide area network (WAN) module, a local area network module (e.g., WiFi), a personal area network module (e.g., Bluetooth), and/or any other suitable communication modules to allow the image server 112 to communicate over the network(s) 104.

Turning to the contents of the memory 1002 in more detail, the memory 1002 may store an operating system 1006, the search service 106, the graph application 110, and one or more applications 1008 for implementing all or a part of applications and/or services using the search service 106.

The one or more other applications 1008 may include an email application, online services, a calendar application, a navigation module, a game, and the like. The memory 1002 in this implementation may also include an approximate k-NN graph module 1010, a propagation module 1012, and a manifold ranking module 1014.

The graph application module 110 may perform the operations described with reference to the figures or in combination with the search service module 106, the approximate k-NN graph module 1010, the propagation module 1012, and/or the manifold ranking module 1014.

The approximate k-NN graph module 1010 may perform the operations separately or in conjunction with the graph application module 110, as described with reference to FIGS. 3-6. The propagation module 1012 may perform the operations separately or in conjunction with the graph application 110, as described with reference to FIGS. 7-9.

The manifold ranking module 1014 may rank the search results with respect to the image query 114. For example, the manifold ranking module 1014 constructs a low-dimensional manifold with the approximate k-NN graph from a high-dimensional feature and then orders the images according to distances along the manifold and/or Euclidean distances (e.g., an ordinary distance between two data points). The manifold ranking module 1014 may compute a geodesic distance along the approximate k-NN graph to perform the manifold ranking.

In an implementation, the manifold ranking module 1014 computes ranking results via the approximate k-NN graph over a collection of images, a database, or the like. The collection of images include images represented by a 384-dimensional Generalized Search Tree (GiST) feature. The manifold ranking module 1014 considers the tags associated with the images and evaluates the distance as infinity, if two images do not share any common tags. Based on this information, the manifold ranking module 1014 tends to return more images with a same object as the image query 114 than other search applications.

The server 112 may include (or have access to) the database 118 to store images, algorithms, hash table, lists, and the like. Alternatively, this information may be stored on other databases.

The server 112 may also include additional removable storage 1016 and/or non-removable storage 1018 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 1002 may include multiple different types of memory, such as static random access memory (SRAM), dynamic random access memory (DRAM), or ROM.

The server 112 as described above may be implemented in various types of systems or networks. For example, the server may be a part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or computing devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method implemented at least partially by a processor, the method comprising:
   identifying an image query;
   constructing an approximate k-Nearest Neighbor (k-NN) graph to retrieve images similar in appearance to the image query by:
      receiving a set of data points from an external source, the set of data points comprising at least one of a collection of digital images, video sequences, or both;
      partitioning the data points into subsets to identify nearest-neighboring data points for each data point, wherein the partitioning the data points further comprises recursively dividing the data points into subsets;
      connecting each data point with the nearest-neighboring data points in a subset in which the data points represent nodes to form a subgraph;
      forming multiple subgraphs, which are to be combined to form a base approximate k-NN graph;
      creating additional base approximate k-NN graphs, which are merged to create the approximate k-NN graph;
   retrieving images similar in appearance to the image query by identifying best NN data points from the approximate k-NN graph.

2. The method of claim 1, wherein the partitioning the data points comprises recursively dividing the data points into the subsets with no overlaps.

3. The method of claim 1, wherein the partitioning the data points comprises using a methodology of a random hierarchical binary partition.

4. The method of claim 1, wherein the partitioning the data points comprises dividing the data points into two or more overlapping subsets.

5. The method of claim 1, further comprising:
   ranking the retrieved images that are similar to the image query by constructing a low-dimensional manifold with the approximate k-NN graph from a high-dimensional feature; and
   ordering the retrieved images based on distances measured along the low-dimensional manifold.

6. The method of claim 1, further comprising propagating the approximate k-NN graph from an immediate neighborhood to other neighborhoods by:
   expanding from the immediate neighborhood of a node to identify additional neighboring nodes in the other neighborhoods by a best-first manner; and
   retrieving the additional neighboring nodes in the other neighborhoods, the additional neighboring nodes are identified as true neighbors; and
   identifying the best NN data points from the retrieved additional neighboring nodes.

7. The method of claim 6, further comprising stopping the expansion of the approximate k-NN graph into neighborhoods when the priority queue is empty or when the priority queue reaches or exceeds a threshold number of visited nodes.

8. The method of claim 1, further comprising:
   accessing a previously-identified neighborhood for each data point; and
   expanding the previously-identified neighborhood of each data point to identify additional neighbors; and
   moving all of neighbors in the previously-identified neighborhood into a priority queue and a result set.

9. The method of claim 8, further comprising:
   iteratively distinguishing the data point from a top of the priority queue; and
   moving non-visited neighbors from a top point into the priority queue and the result set.

10. One or more computer-readable storage devices storing instructions that, when executed by a processor, cause one or more processors to perform acts comprising:
    receiving a set of data points from an external source, the set of data points comprising at least one of a collection of digital images, video sequences, or both;
    recursively dividing the set of data points into multiple subsets;
    finding nearest-neighboring data points for each data point;
    creating a first subset of a first data point connected to its nearest-neighboring data points and a second subset of a second data point connected to its nearest-neighboring data points, in which the data points and the nearest-neighboring data points in the first subset and the second subset represent nodes to form subgraphs;
    forming multiple subgraphs, which are to be combined to form a base approximate k-NN graph;
    merging multiple base approximate k-NN graph to create an approximate k-Nearest Neighbor (k-NN) graph; and
    propagating the approximate k-NN graph by expanding from a local neighborhood of a local node to other neighborhoods to locate best NN data points.

11. The computer-readable storage devices of claim 10, wherein the recursively dividing comprises:
    partitioning the data points into subsets; and
    partitioning the data points using methodology of a hyperplane or a hypersphere.

12. The computer-readable storage devices of claim 10, wherein the recursively dividing comprises partitioning the set of data points into subsets with overlaps.

13. The computer-readable storage devices of claim 10, further comprising instructions that, when executed, cause the one more processors to perform an act of:
    determining k nearest-neighboring data points for the data point by selecting from neighbors in each subset.

14. The computer-readable storage devices of claim 10, further comprising instructions that, when executed, cause the one more processors to perform the acts comprising:
    presenting a user interface to identify an image query;
    searching for images similar in appearance to the image query based on the approximate k-NN graph; and
    presenting the user interface with a display of retrieved images ranked in order of being similar to the image query.

15. The computer-readable storage devices of claim 14, further comprising instructions that, when executed, cause the one more processors to perform an act of ordering the retrieved images that are similar to the image query based on distances measured along a low-dimensional manifold.

16. A system comprising:
    one or more processors; and
    a memory that includes a plurality of computer-executable components, the plurality of computer-executable components comprising:
       a graph application module that receives an image query in which an approximate k-Nearest Neighbor (k-NN) graph is used to organize a search, wherein the graph application module further receives a set of data points from an external source, the set of data points comprising at least one of a collection of digital images, video sequences, or both;

an approximate k-NN graph module to create the k-NN graph by recursively partitioning data points into multiple subsets and identifying nearest-neighboring data points in a subset such that the data points and the nearest-neighboring data points connect in the subset to represent nodes to create the approximate k-NN graph;

a propagation module that expands the approximate k-NN graph from a local neighborhood of a node to identify nearest-neighboring nodes, such as additional nodes in other neighborhoods, and identifying best k-NN data points from the additional nodes; and the approximate k-NN graph module to perform searches for images similar to the image query by using the approximate k-NN graph to retrieve the additional nodes.

17. The system of claim 16, further comprising a manifold ranking module to perform an act of ranking the retrieved nodes according to a similarity to the image query by constructing a low-dimensional manifold with the approximate k-NN graph from a high-dimensional feature and ordering the retrieved nodes according to distances measured along the low-dimensional manifold.

18. The system of claim 16, wherein the approximate k-NN graph module further comprises performing an act of computing distances between a pair of data points and selecting a k smallest distance for each data point.

19. The system of claim 16, wherein the approximate k-NN graph module further comprises performing an act of storing information in a hash table for distances calculated between a pair of data points.

20. The system of claim 16, wherein the graph application module further comprises performing the acts of:

creating a first subset of a first data point connected to its nearest-neighboring data points and a second subset of a second data point connected to its nearest-neighboring data points, in which the data points and the nearest-neighboring data points in the first subset and the second subset represent nodes to form multiple subgraphs;

combining the multiple subgraphs to form base approximate k-NN graphs; and merging multiple base approximate k-NN graphs to create the approximate k-NN graph.

* * * * *